Aug. 1, 1967    B. A. QUINN    3,333,879
DOOR LATCH MECHANISM
Filed Aug. 5, 1965    3 Sheets-Sheet 1

INVENTOR.
BERT A. QUINN
BY
Merchant, Merchant & Gould
ATTORNEYS

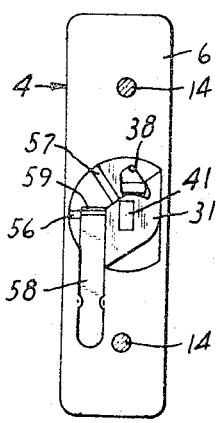 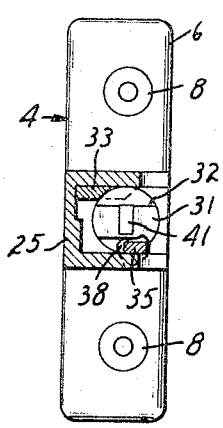 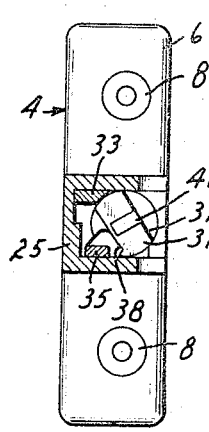 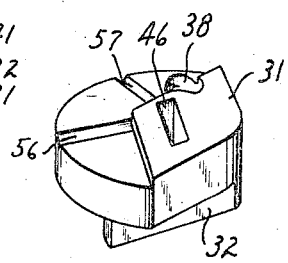
FIG. 4    FIG. 5    FIG. 6    FIG. 11
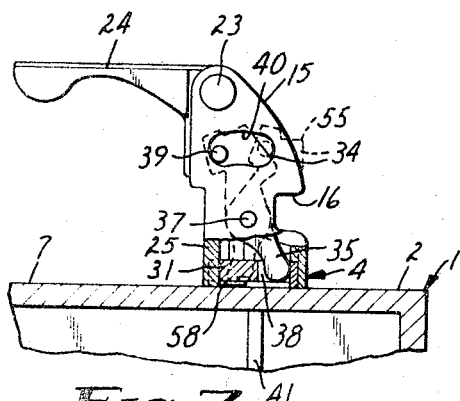 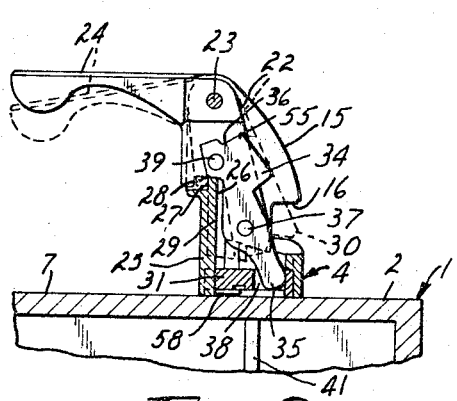
FIG. 7    FIG. 8
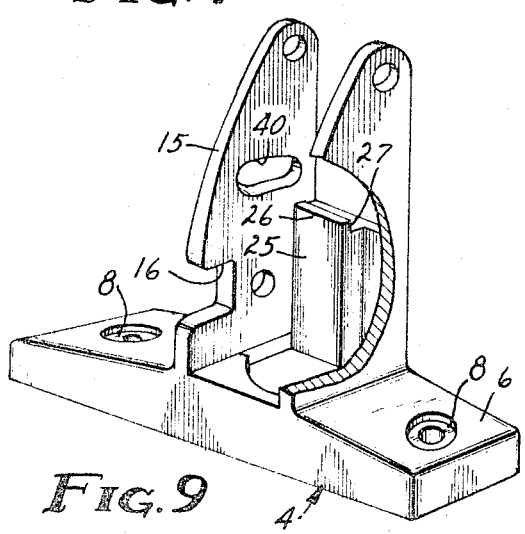 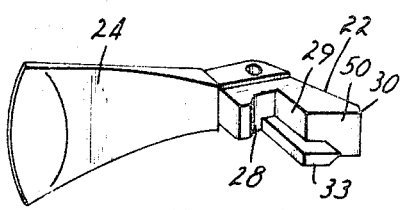
FIG. 9    FIG. 10
INVENTOR.
BERT A. QUINN
BY
Merchant, Merchant & Gould
ATTORNEYS Aug. 1, 1967  B. A. QUINN  3,333,879
DOOR LATCH MECHANISM
Filed Aug. 5, 1965  3 Sheets-Sheet 3
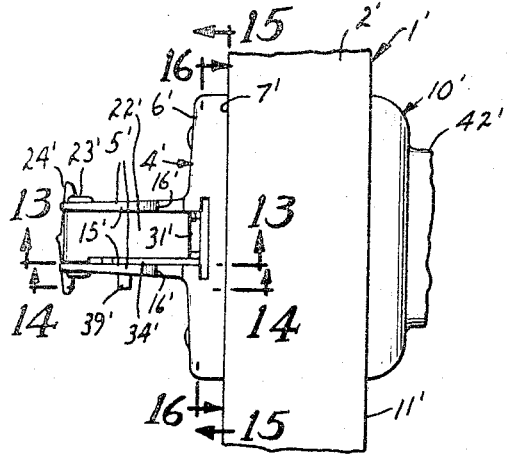
FIG.12
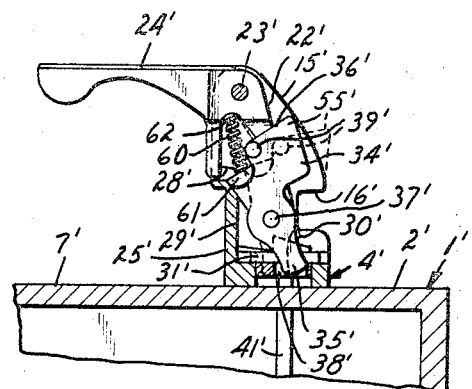
FIG.13
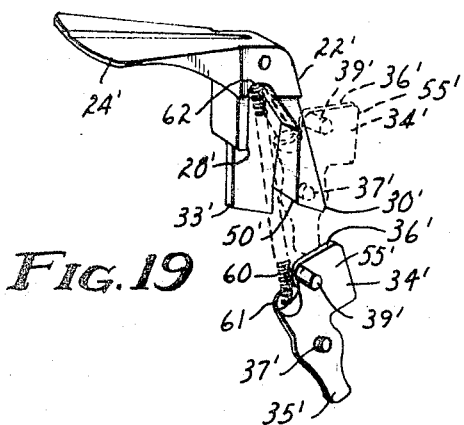
FIG.19
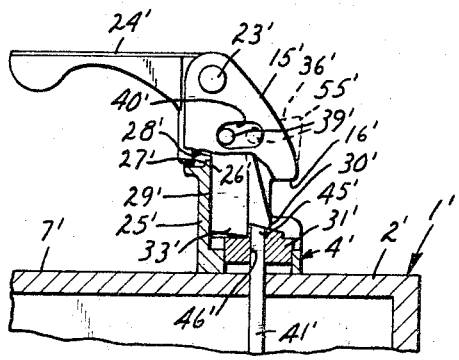
FIG.14
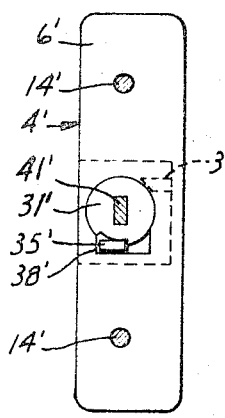
FIG.15
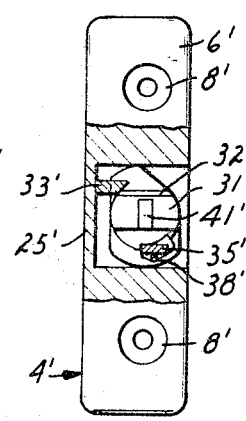
FIG.16
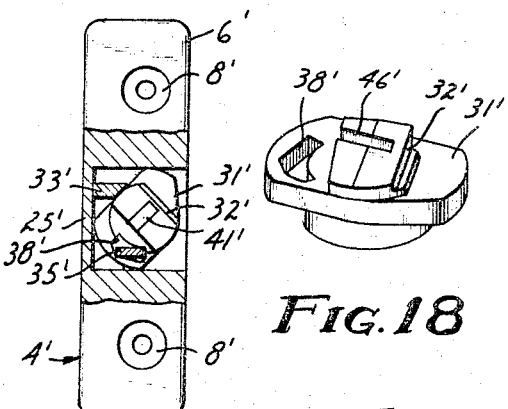
FIG.18
FIG.17
INVENTOR.
BERT A. QUINN
BY
Merchant, Merchant + Gould
ATTORNEYS United States Patent Office 3,333,879
Patented Aug. 1, 1967

3,333,879
DOOR LATCH MECHANISM
Bert A. Quinn, St. Paul, Minn., assignor to Ideal Brass Works, Incorporated, St. Paul, Minn., a corporation of Minnesota
Filed Aug. 5, 1965, Ser. No. 477,499
5 Claims. (Cl. 292—254)

ABSTRACT OF THE DISCLOSURE

Door latch mechanism including a relatively stationary latch hook and a cooperating relatively movable strike adapted to be mounted on a door and a door frame respectively, and release means on the latch hook engageable with the strike from the latch hook to permit opening of the door. An anti-latching member, mounted on the latch hook for movements independently of the latch release member, engages the strike, in one position of movement of the anti-latching member, to prevent latching engagement of the strike with the latch hook during closing movements of the door.

Summary of the invention

This invention is in the nature of a modification or improvement of structures of the type disclosed in my prior U. S. Letters Patent 3,039,804, issued June 19, 1962, and involves in combination with such structures, an anti-latching member for enabling a user to avoid being accidentally locked outside the door without a key. The anti-latching member is mounted on the relatively stationary latch hook of a door for movements toward and away from a position in which the member will engage a door frame-mounted retractable strike, during closing movement of the door, in a manner to prevent latching engagement of the latch hook with the strike. The anti-latching member further includes a portion which, when it is disposed in its strike-engaging position, engages a locking member to a movable latch release member of the latch mechanism against latch-releasing movements when the door is latched closed.

Referring to the drawings, which illustrate the invention and wherein like reference characters indicate like parts or elements throughout the several views:

FIG. 4 is a view partly in section and partly in side elevation of the escutcheon plate and taken substantially on the line 4—4 of FIG. 3;

FIG. 5 is a view partly in section and partly in side elevation and taken substantially on the line 5—5 of FIG. 2, some parts being removed;

FIG. 6 is a view corresponding to FIG. 5, but showing some of the parts in a different position;

FIG. 7 is a fragmentary view in section taken substantially on the line 7—7 of FIG. 2, some parts being broken away and alternative position of some parts being shown by dotted lines;

FIG. 8 is a fragmentary view in section taken substantially on the line 8—8 of FIG. 2, some parts being broken away and some parts being shown in an alternative position by dotted lines;

FIG. 9 is a view in perspective of the latch hook structure of this invention, some parts being broken away;

FIG. 10 is a view in perspective of the latch release member of this invention;

FIG. 11 is a view in perspective of the locking member of this invention;

FIG. 12 is a fragmentary view in side elevation of a door showing an alternative embodiment of this invention in elevation;

FIG. 13 is a fragmentary view in section taken substantially on the line 13—13 of FIG. 12, some parts being broken away and alternative positions of some parts being shown by dotted line;

FIG. 14 is a fragmentary view in section taken substantially on the line 14—14 of FIG. 12, some parts being broken away, and alternative positions of some parts being shown by dotted lines;

FIG. 15 is a view in section taken substantially on the line 15—15 of FIG. 12 and showing the escutcheon plate in elevation;

FIG. 16 is a view in section taken substantially on the line 16—16 of FIG. 12;

FIG. 17 is a view corresponding to FIG. 16 but showing the locking structure in a different position;

FIG. 18 is a view in perspective of the locking member of the embodiment shown in FIGS. 12–17; and FIG. 19 is an exploded view in perspective of the latch release member and the locking member with an alternative position being shown by dotted lines.

Figure 1:
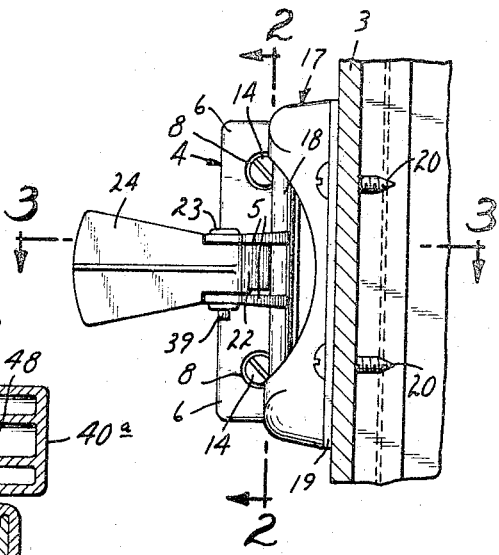
FIG. 1 is a fragmentary view in side elevation of a conventional door and door frame and showing the latch mechanism of the present invention mounted thereon.
Figure 3:
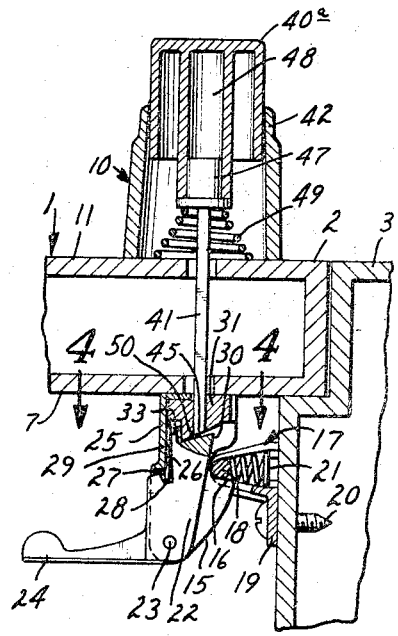
FIG. 3 is a fragmentary view in horizontal section taken substantially on the line 3—3 of FIG. 1.

Referring again to the drawings and particularly to FIGS. 1 and 3 thereof, the reference numeral 1 represents a door having a vertically extending side rail 2 which defines an elongated free edge portion. The vertical side rail 2 of the door 1 engages an adjacent jamb 3 when the door 1 is in a closed position as illustrated particularly in FIG. 3. It will be understood that the present door latch mechanism may be employed upon various types of doors and door frames made of wood or metal; however, the construction of the door 1 and jamb 3 shown herein utilized hollow members formed from extruded aluminum.

The latch mechanism of the present invention includes a latch hook 4 which, as shown particularly in the drawings, comprises a pair of spaced generally parallel hook elements 5 which are formed with a base member or escutcheon plate 6. It will be understood that a single hook element may be substituted for the spaced hook elements 5 if so desired. The escutcheon plate 6 of the door latch mechanism is adapted for mounting on the inner surface 7 of the side rail 2, and for this purpose, the escutcheon plate 6 is provided with a pair of recesses 8 which are aligned with openings 9 which are provided in the inner surface 7 of the door side rail. 2. A cooperating mounting base, represented generally by the reference numeral 10, is provided at the outer surface 11 of the door side rail 2, and same defines a pair of spaced mounting bosses 12 which extend through aligned openings 13 in the outer surface 11 of the door side rail 2. The openings 13 in the outer surface 11 of the side rail 2 are formed in corresponding alignment with the respective openings 9 defining in the side rail inner surface 7. The mounting bosses 12 of the outer base 10 define internal screw threads for the reception of mounting screws 14 in order to securely fasten the escutcheon plate 6 and the mounting base 10 upon the opposite sides of the door side rail 2. The mounting of the escutcheon plate 6 and the mounting base 10 is illustrated particularly in FIG. 2 of the drawings.

It will be noted that a latch mechanism of the general type referred to above is shown in my previous United States Letters Patent No. 3,039,804 issued June 19, 1962.

As noted, the latch hook 4 may be formed with a single hook element, but as specifically shown in the drawings, the spaced hook elements 5 of the latch hook 4 define co-planar cam surfaces 15 and also a pair of co-planar latching surfaces 16. The co-planar surfaces 15, 16 are arranged and located to engage a strike element 17 that is secured to the adjacent jamb 3. The strike element 17 more specifically comprises an elongated rod 18 carried by a mounting bracket 19 secured in the desired position to the jamb 3 by means of mounting screws 20. The rod 18 of the strike element 17 is extensible and retractable into and out of a path of travel of the latch hook 4 of the latch mechanism when the door 1 is being opened or closed past the strike element 17. The strike element 17 is yieldingly outwardly biased toward the path of travel of the hook elements 5 of the latch mechanism by means of a pair of coiled compression springs 21 received within the mounting bracket 19, as shown particularly in FIG. 3. The strike element 17 may be of the type more particularly shown and described in my previous United States Letters Patent 2,973,986 issued on Mar. 7, 1961. The latch hook 4 of the latch mechanism is positioned relative to the strike element 17 so that during closing movements of the door 1, the cam surfaces 15 of the hook elements 5 engage the rod 18 of the strike element 17 and push the same in a retracting direction against the yielding bias of the coiled compression springs 21. However, when the door 1 is positioned in a completely closed condition against a jamb 3, as shown particularly in FIG. 3, the elongated rod 18 of the strike element 17 is biased outwardly into engagement with the co-planar latching surfaces 16 so as to latch against the hook elements 5, as illustrated particularly in FIG. 3. The latch mechanism of the present invention further comprises a release member 22 for imparting retracting movements to the elongated rod 18 of the strike element 17 so as to permit opening movements of the door 1. The release member 22 is pivotally mounted between the hook elements 5 of the latch hook 4 by means of a mounting pin 23. Further, the release member 22 defines an elongated handle 24 which extends laterally outwardly adjacent the inner surface 7 of the door 1. The latch hook member 4 of the latch mechanism defines a web portion 25 extending between the hook elements 5, and the web portion 25 is arranged to define inner and outer surfaces 26, 27 respectively. The release member 22 also defines a heel portion having an inner surface portion 28 and an outer surface portion 29 which cooperate with the surfaces 26, 27 of the latch hook member 4 for limiting the pivotal movements of the release member 22 in opposite directions about the axis of the mounting pin 23.

Referring to FIG. 8, it will be noted that when the elongated handle 24 of the release member 22 is moved in a direction towards the door 1 to a position shown by dotted lines, the toe portion 30 of the release member 22 engages the elongated rod 18 of the strike element 17 to retract the same against the bias of the coil springs 21, whereby the strike element 17 is moved out of engagement with the latching surfaces 16 of the hook elements 5. Such movement of the release member 22 occasioned by inward movement of the handle 24 in the dotted line position of FIG. 8 is limited upon engagement of the inner surface portion 28 of the release member 22 with the outer surface 27 of the latch hook web portion 25. It will be noted that in accordance with present practices, the handle 24 is pushed in the same direction necessary to open door 1 from the inside, whereby the unidirectional movement of the elongated handle 24 serves both to release the latch and impart opening movement to the door 1. Further, when the door 1 is closed from within, the elongated handle 24 is pulled away from the door 1, whereby the toe portion 30 of the release member 22 is retracted out of its strike engaging position so as to permit the strike element 17 to engage the matching surfaces 15, 16 of the hook elements 5, as shown by full lines in FIG. 3. Outward movement of the handle 24 is limited by the abutting engagement of the outer surface portion 29 of the release member 22 with the inner surface 26 of the latch hook web portion 25.

The latch member of the present invention further comprises lock means for releasably locking the release member 22 against latch releasing engagement with the strike element 17. Such means comprises a generally cylindrical locking member 31 shown particularly in FIG. 11 of the drawings. The locking member 31 is journalled for limited rotary movements within a socket defined in the base or escutcheon plate 6 of the latch hook 4. The locking member 31 defines a stop block 32 which is adapted to be moved into and out of the path of an extending finger 33 defined by the release member 22.

An important feature of the present invention is the provision of a novel locking lever 34 for cooperation with and actuation of the above noted locking member 31. The locking lever 34 is formed from a relatively thin sheet of material and is disposed adjacent one of the hook elements 5, as shown particularly in FIGS. 2 and 7. The locking lever 34 is pivotally mounted intermediate its inner and outer end portions 35, 36 by means of a lateral pin 37 pivotally secured in the adjacent hook element 5. The inner end portion 35 of the locking lever 34 defines a finger received within a recess 38 defined by the locking member 31, as shown particularly in FIGS. 4–8. With this novel arrangement it will be noted that upon typical rocking movements of the locking lever 34 about its intermediate pin connection, limited rotary movements will be imparted to the locking member 31 between the opposite positions shown in FIGS. 5 and 6. For this purpose, the outer end portion 36 of the locking lever 34 defines a handle portion 39 which projects through an elongated slightly arcuate slot 40 defined in the hook element 5, as shown particularly in FIG. 7. When the locking lever 34 is in the position shown by full lines in FIGS. 5 and 7, the stop block 32 of the locking member 31 is out of the path of travel of the finger 33 of the release member 22 so as to permit operation of the release member 22. However, when the locking lever 34 is moved to the position shown in FIG. 6 and dotted line position of FIG. 7, the stop block 32 is disposed in the path of travel of the finger 33 so as to prevent strike engaging movements of the release member 22.

Figure 2:
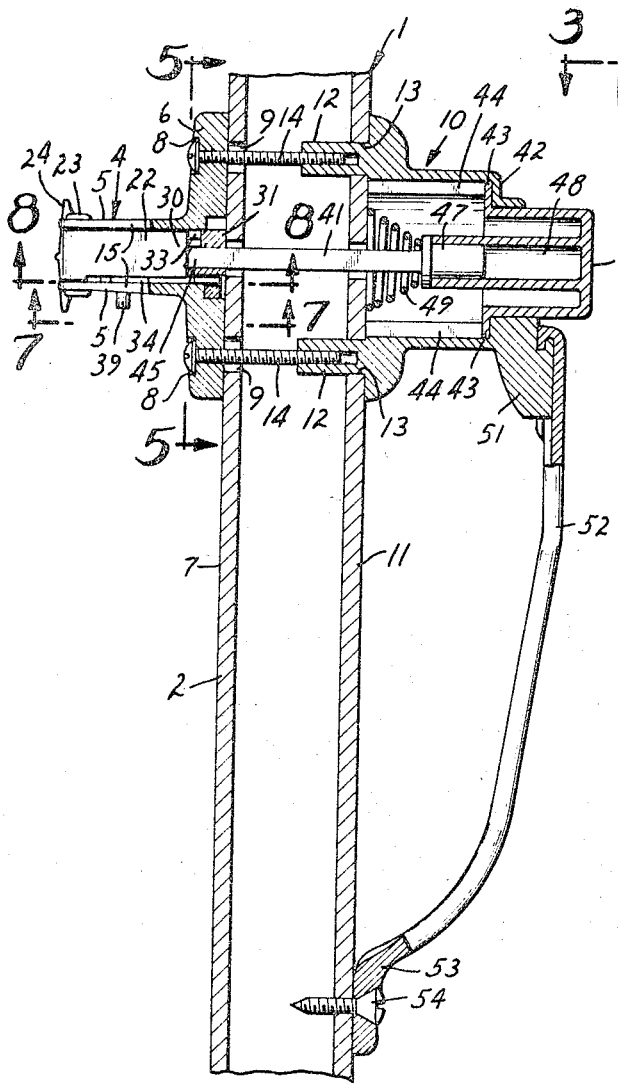
FIG. 2 is a fragmentary view in vertical section taken substantially on the line 2—2 of FIG. 1.

This invention also includes a latch releasing device provided for the purpose of unlatching the door 1 from the exterior, and the same comprises a push button 40a and a cooperating push rod 41, as shown particularly in FIGS. 2 and 3. The push button 40a and the rod 41 are mounted for movements in a direction generally axially of the locking member 31, and the button 40 is carried by housing 42 defined by the mounting base 10. The push button 40a defines a pair of diametrically extending lugs 43 received in corresponding channels 44 defined by the housing 42 in order to prevent rotary movement of the button 40a.

Further, the push rod 41 extends inwardly through aligned openings in the inner and outer surfaces 7, 11 of the door rail 2, and the end portion 45 of the rod 41 extends through an axial opening 46 defined by the generally cylindrical locking member 31. Also, the push rod 41 is connected to the button 40a by means of a flange-equipped stud 47 received within a socket portion 48 defined by the button 40a, and a compression spring 49 is received on the rod 41 and abuts against the flange thereof for yieldingly biasing the rod 41 and button 40a in an outward direction. The inner end portion 45 of the push rod 41 is tapered and engages a cam surface 50 defined by the release member 22 upon generally axially directed movement being imparted to the push rod 41 by the button 40a against the bias of the spring 49. With this arrangement, the depression of the button 40a moves the release member 22 to the dotted line position of FIG. 8 so as to disengage the strike element 17 from the latching surfaces 16 of the hook elements 5.

As shown particularly in FIG. 2, the button housing 42 for the latch mechanism defines a lug 51 for reception within grooves defined by one end portion of an elongated handle 52. The handle 52 is thereby mounted to the housing 42, and a depending end portion 53 of the handle 52 is secured to the door rail 2 by means of a mounting screw 54 or the like.

An important feature of the present invention is the provision of antilatching means defined by the locking lever 34, such means more particularly comprising a projecting hook portion 55, as shown particularly in FIGS. 7 and 8. When the locking lever 34 is moved to the dotted line position shown in FIG. 7 so as to position the stop block 32 of the locking member 31 in a position to prevent movement of the release member 22, the hook portion 55 of the locking lever 34 projects outwardly beyond the hook elements 5 of the latch so as to be in a position to engage the rod 18 of the strike element 17 upon closing movements of the door. It is important to note that when the locking lever 34 is disposed with its hook portion 55 in its outwardly projected position, as shown by dotted lines in FIG. 7, the hook portion 55 will engage the strike element 17 so as to prevent the latching of the door upon its being closed.

In order that the cylindrical locking member 31 may be releasably held in its opposite positions of rotary movement, the locking member 31 defines a pair of circumferentially spaced radially extending grooves 56, 57. Further, a leaf spring 58 is anchored to the under surface of the escutcheon plate 6 and defines an end detent 59 for selective engagement in a different one of the radial grooves 56, 57 of the locking member 31 at the opposite extreme positions of rotary movement thereof.

Another embodiment of this invention is shown particularly in FIGS. 12–18, and it will be noted that this embodiment hereinafter described corresponds in all respects not specifically hereinafter mentioned to the embodiment first described above and shown in FIGS. 1–11. Also, the parts or elements of the following embodiment which correspond to like parts or elements of the embodiment shown in FIGS. 1–11 are denoted by use of the same reference characters with prime marks added thereto. In this embodiment, a coiled compression spring arranged in cooperation with the locking lever 34' is substituted for the leaf spring 58 of the embodiment noted previously. As shown particularly in FIGS. 13 and 19, the release member 22' defines a socket recess 61 adapted to receive one end portion of the coil spring 60, and the other end portion of the coil spring 60 is received in a cup shaped recess 62 defined by the locking lever 34'. With this arrangement, it is important to note that the coiled compression spring 60 is interposed between the release member 22' and the locking lever 34' and arranged so as to form a toggle urging the locking lever 34' to one or the other of the opposite sides of a line drawn between the pivot pin 37' mounting the locking lever 34' and the engagement of the coil spring 60 with the socket recess 61 of the release member 22'. Referring to FIG. 13, it will be appreciated that when the locking lever 34' is moved to the full line position shown therein, the coil spring 60 is on the left side of the above noted line so as to maintain the locking lever 34' and the cylindrical locking member 31' in the unlocked position shown in FIG. 16 permitting movement of the release member 22'. However, when the locking lever 34' is moved to the dotted line position shown in FIG. 13, the coil spring 60 will be disposed on the opposite side of the above noted line between the pin 37' and the socket recess 61 so as to maintain the locking lever 34' and the cylindrical locking member 31' in the locking and antilatching position thereof preventing movement of the release member 22' and also positioning the hook portion 55' so as to prevent the latching of the door upon closing movements thereof.

The present invention has been tested and found to be completely satisfactory for the accomplishment of the objects and advantages noted initially above; and while preferred embodiments have been shown and described, it should be understood that the same may be modified without departure on the scope and spirit of the appended claims.

What is claimed is:
1. In a door latch mechanism,
 (a) a rigid latch hook having a base portion adapted to be mounted on one side of a door for common movements therewith,
 (b) a cooperating strike element adapted to be mounted on a door frame in the path of travel of said latch hook, said strike element being yieldingly urged into said path of travel of the latch hook and retractable transversely out of said path,
 (c) said latch hook comprising a pair of laterally spaced elements and having a strike-engaging cam portion and a strike-engaging hook portion, said strike being engaged by said cam portion and retractable thereby during closing movements of the door and urged into engagement with said hook portion when the door is fully closed,
 (d) a release member disposed between said spaced elements of said latch hook and pivotally connected thereto for swinging movements toward and away from engagement with said strike when the strike is disposed in engagement with said hook portion,
 (e) an operating handle formed with said release member and movable to impart retracting movement to said strike whereby to permit the door to open,
 (f) a movable release member operating device including means for mounting same on the opposite side of said door, and
 (g) a combination locking and anti-latching means mounted on said latch hook for releasably locking said release member against movement in a direction to engage said strike when the door is closed, said combination means also being movable to engage said strike upon closing movements of the door so as to prevent the latching of said door.
2. In a door latch mechanism,
 (a) a rigid latch hook having a base portion adapted to be mounted on one side of a door for common movements therewith,
 (b) a cooperating strike element adapted to be mounted on a door frame in the path of travel of said latch hook, said strike element being yieldingly urged into said path of travel of the latch hook and retractable transversely out of said path,
 (c) said latch hook comprising a pair of laterally spaced elements and having a strike-engaging cam portion and a strike-engaging hook portion, said strike being engaged by said cam portion and retractable thereby during closing movements of the door and urged into engagement with said hook portion when the door is fully closed,
 (d) a release member disposed between said spaced elements of said latch hook and pivotally connected thereto for swinging movements toward and away from engagement with said strike when the strike is disposed in engagement with said hook portion,
 (e) an operating handle formed with said release member and movable to impart retracting movement to said strike whereby to permit the door to open,
 (f) a movable release member operating device including means for mounting same on the opposite side of said door, and
 (g) anti-latching means mounted on said latch hook for movement independently of said release member and having a portion projecting outwardly of said cam portion and engaging said strike responsive to movement of said anti-latching means in one direction and upon closing movements of the door so as to prevent the latching of said door.
3. In a door latch mechanism,
 (a) a rigid latch hook having a base portion adapted to be mounted on one side of a door for common movements therewith,

(b) a cooperating strike element adapted to be mounted on a door frame in the path of travel of the latch hook and retractable transversely out of said path, (c) said latch hook comprising a pair of laterally spaced elements and having a strike-engaging cam portion and a strike-engaging hook portion, said strike being engaged by said cam portion and retractable thereby during closing movements of the door and urged into engagement with said hook portion when the door is fully closed, (d) a release member disposed between said spaced elements of said latch hook and pivotally connected thereto for swinging movements toward and away from engagement with said strike when the strike is disposed in engagement with said hook portion, (e) an operating handle formed with said release member and movable to impart retracting movement to said strike whereby to permit the door to open, (f) a movable release member operating device including means for mounting same on the opposite side of said door, and (g) lock means for releasably locking said release member against movement in a direction to engage said strike, said lock means comprising:

(1) a locking member journalled in said latch hook portion for limited rotary movement, said locking member being formed with a lug and said lug being movable in response to rotation of said locking member in opposite directions and between a locked position in the path of travel of said release member and an unlocked position out of the path of travel thereof, (2) a locking lever having a handle portion and being pivotally mounted, on said latch hook and disposed adjacent said release lever, said locking lever engaging said locking member and moving the lug thereof between its said positions, said locking lever defining an outwardly projecting hook portion disposed to engage said strike, when said locking lever is moved to position the lug of said locking member in its locked position so as to engage said strike upon closing movements of the door and preventing the latching of said door, and (3) spring means for yieldingly holding said locking member against its said rotary movement.

4. The door latch mechanism defined in claim 3 in which said spring means comprises a coil spring connected to said release member and said locking lever and positioned to form a toggle urging said locking lever to one or the other of opposite sides of a line between the pivotal mounting of said locking lever and the point of connection of the spring with said release member.

5. The door latch mechanism defined in claim 3 in which said locking member defines a pair of circumferentially spaced recesses, said spring means comprising a spring having a detent received in a different one of said recesses of said locking member at opposite limits of rotary movement of said locking member and yieldingly holding said locking member against said rotary movement thereof.

References Cited
UNITED STATES PATENTS

| | | | |
|---|---|---|---|
| 829,825 | 8/1906 | Alexander | 292—210 X |
| 1,144,537 | 6/1915 | Gabriel | 292—254 X |
| 1,435,971 | 11/1922 | Mueller. | |
| 2,950,137 | 8/1960 | Check | 292—228 |
| 3,039,804 | 6/1962 | Quinn | 292—254 |

MARVIN A. CHAMPION, *Primary Examiner.*

RICHARD E. MOORE, *Examiner.*